United States Patent
Isley, Jr. et al.

[11] Patent Number: 5,930,295
[45] Date of Patent: Jul. 27, 1999

[54] MOBILE TERMINAL APPARATUS INCLUDING NET RADIO SERVICE IN A MOBILE SATELLITE SERVICE COMMUNICATION SYSTEM

[76] Inventors: William C. Isley, Jr., 12510 Killian La., Bowie, Md. 20715; Denise M. Cammarata, 12087 Long Lake Dr., Owings Mills, Md. 21117; Raymond R. Cooper, 6820 Campfield Rd., Baltimore, Md. 21207; Jeffrey D. York, 410 Stanford Ct., Arnold, Md. 21012; Perry E. King, Jr., 6805 Littlewood Ct., Eldersburg, Md. 21784

[21] Appl. No.: 08/605,978
[22] Filed: Feb. 23, 1996
[51] Int. Cl.[6] ................................... H04B 1/38
[52] U.S. Cl. ............... 375/219; 375/259; 375/224; 375/200; 455/426; 455/11.1
[58] Field of Search ...................... 375/200, 219, 375/224, 344, 325, 259; 455/12.1, 11.1, 15, 426, 38.3, 522, 69, 456; 370/335

[56] References Cited

U.S. PATENT DOCUMENTS

| | | | |
|---|---|---|---|
| 5,404,375 | 4/1995 | Kroeger et al. | 375/200 |
| 5,465,386 | 11/1995 | Barnes et al. | 455/15 |
| 5,628,049 | 5/1997 | Suemitsu | 455/11.1 |
| 5,717,830 | 2/1998 | Sigler et al. | 455/426 |
| 5,742,639 | 4/1998 | Fasulo, II et al. | 375/219 |

FOREIGN PATENT DOCUMENTS 9612377 4/1996 WIPO.
9633584 10/1996 WIPO.

*Primary Examiner*—Stephen Chin
*Assistant Examiner*—Shuwang Liu
*Attorney, Agent, or Firm*—Westinghouse Elect. Corp.

[57] ABSTRACT

A mobile terminal for satellite communication of voice data, facsimile and computer information, which consists of an RF transceiver section, and a processor board. The processor board has two digital signal processors and a multi-task control processor for controlling the operation of the two signal processors. Net radio service is implemented in the mobile terminal and includes a priority 1 mode wherein a channel search is performed on a net radio channel database for an available channel if any problem is initially encountered in obtaining control of a specific communication channel such as a channel currently in use or a channel designated for use as a default channel.

14 Claims, 7 Drawing Sheets

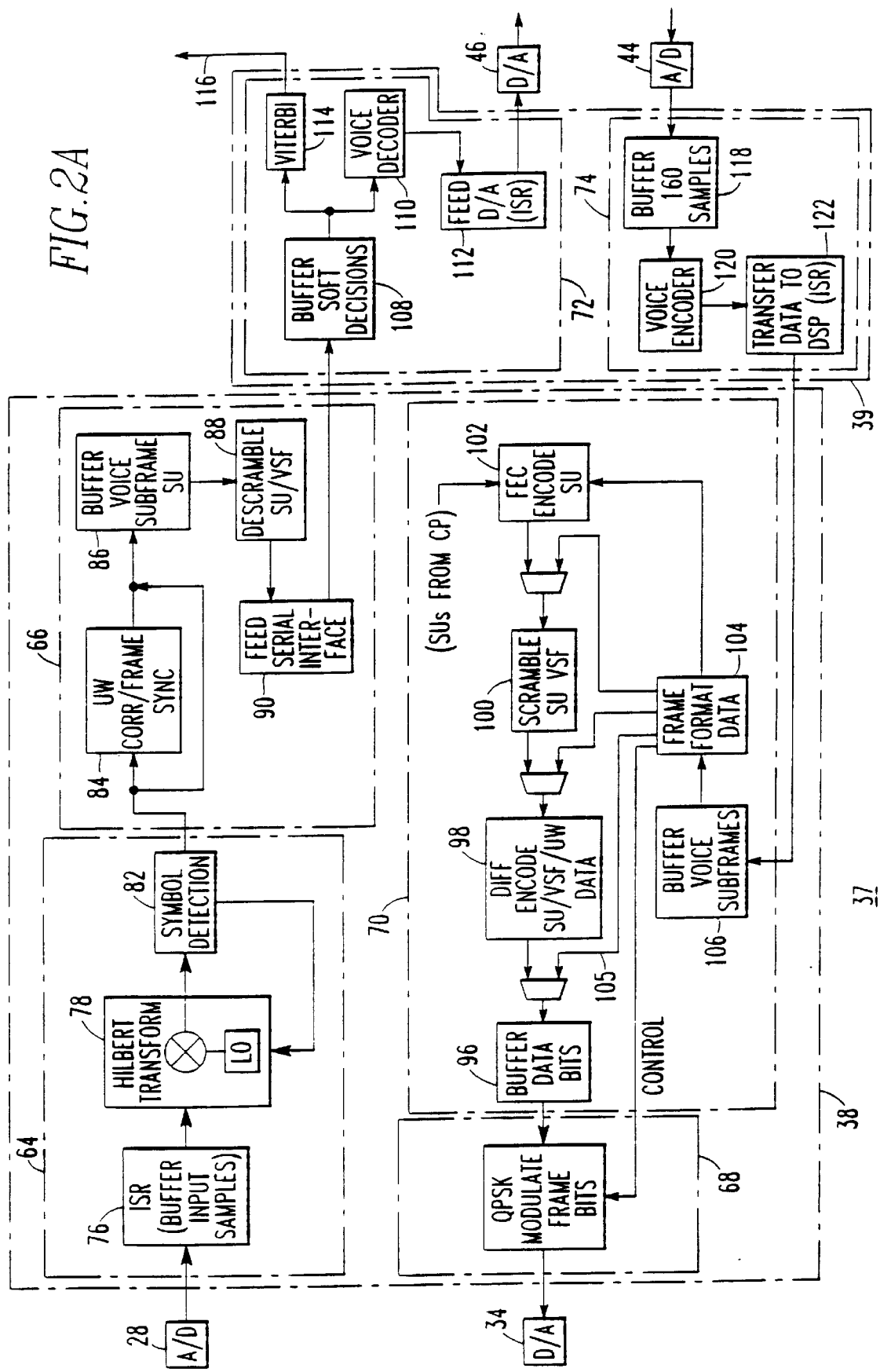

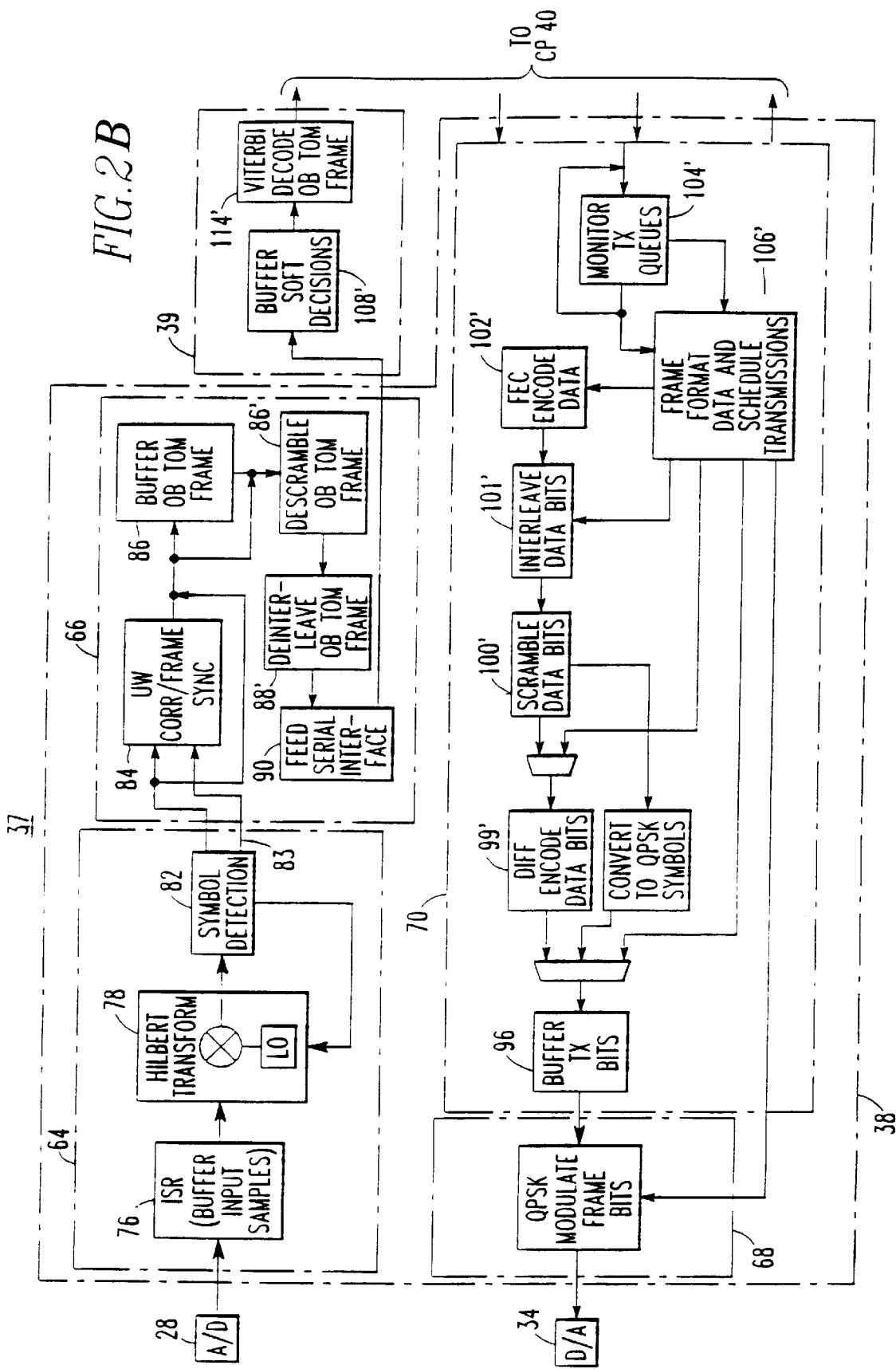

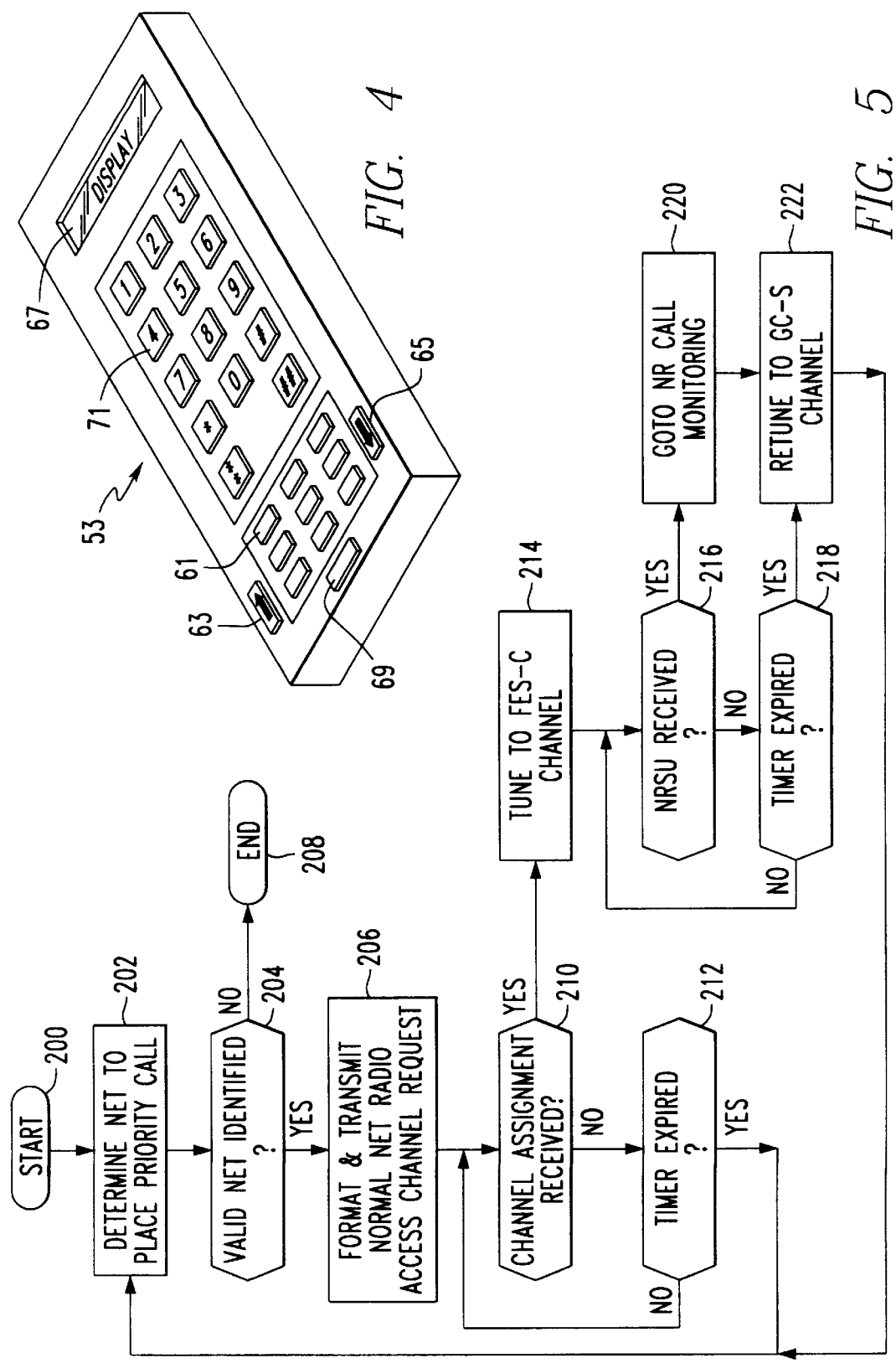

MOBILE TERMINAL APPARATUS INCLUDING NET RADIO SERVICE IN A MOBILE SATELLITE SERVICE COMMUNICATION SYSTEM

CROSS REFERENCE TO RELATED APPLICATION

This application is related to U.S. Pat. No. 5,742,639, issued Apr. 21, 1998, entitled "Mobile Terminal Apparatus and Method For A Satellite Communication System," filed in the names of Albert J. Fasulo et al. and assigned to the assignee of the subject invention, and which is relied upon and incorporated herein by reference.

BACKGROUND OF THE INVENTION

1. Field of the Invention

The present invention relates to mobile terminals for mobile satellite services (MSS) communications networks and more particularly to such mobile terminals which are adapted to operate in a net radio communications mode.

2. Description of Prior Art

In U.S. Pat. No. 5,404,375, entitled "Process and Apparatus For Satellite Data Communications" which issued to Brian W. Kroeger et al on Apr. 14, 1995, and assigned to the assignee of the subject invention, there is disclosed a system for transmitting and receiving outbound and inbound data signals through a satellite communications network, the system including a satellite and an end user transceiver for transmitting and receiving the inbound and outbound data signals. The end-user transceiver additionally includes means for transmitting the outbound data signal and for receiving the inbound data signal.

Such systems are also known to include a net radio service capability which comprises the satellite equivalent of terrestrial trunked communications systems where a plurality of designated users of a "net" need to communicate with each other in a closed user group that allows each member of the net to hear what any other user is saying. Each member of the net can also talk when required and thus the system acts like a radio multi-party line.

Presently, satellite systems that cover large geographical areas typically use several satellites that follow different paths at low or medium altitudes so that at least one satellite is at all times covering the desired geographical area. From the standpoint of receiving signals, the low and medium altitude satellites have the advantage of being able to transmit a signal that reaches a mobile terminal unit at the earth's surface with a relatively large amplitude and without appreciable fading. However, such satellite networks are limited in their coverage area per satellite.

It has been recently proposed, to provide a satellite communications network that utilizes a high altitude geosynchronous satellite which is capable of covering an area corresponding to a substantial portion of the earth, for example, North America, so that a total of approximately 6 satellite beams will cover the entire continent from Alaska to Mexico. The satellite for such a network will be approximately 22,600 miles above the equator and will be designed to operate in the L-Band of RF frequencies. For example, the frequency of the signal being transmitted to the satellite will be between 1626 MHz to 1660 MHz; and the frequency of the signal received from the satellite will be between 1525 MHz to 1559 MHz.

Energy travelling this great distance undergoes huge attenuation such that the power flux density incident at the antenna of the mobile unit is approximately $10_{-14}$ watts per square meter. This grossly attenuated signal is further degraded by background noise, and other satellite channel impairments such as Rician fading.

Mobile terminal units capable of receiving signals of this order of amplitude were either limited to paging signals or required extremely sophisticated hardware, which is bulky and heavy and does not lend itself to mobility. Also, the limited functions and expense of such terminal equipment prevent its acceptance among a large segment of potential users.

In light of the foregoing, there is a need for a mobile terminal unit that is not only capable of reliably receiving the attenuated signals, subject to Rician fading, of a high altitude satellite for voice, facsimile, and data communication, but also compact, lightweight, and relatively inexpensive to manufacture.

SUMMARY OF THE INVENTION

Accordingly, the present invention is directed to a mobile terminal apparatus for a high altitude satellite communication network that is able to be used for Net Radio communication which substantially obviates one or more of the problems due to limitations and disadvantages of the related art. Some of the advantages of the mobile terminal apparatus of the present invention is that it overcomes difficult satellite communication channel characteristics such as low receive power, receive signal fading which is caused by both amplitude and phase effects, and close-in adjacent RF channel interference; and yet is compact, lightweight, relatively inexpensive to manufacture, and is sufficiently flexible and adaptable to permit modification for a variety of different applications with a minimum of hardware redesign.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the invention is directed to a mobile terminal apparatus having a Net Radio service capability and one comprising a user interface; a digital signal processor board coupled to the user interface; an antenna for radiating and collecting signals from a satellite; an RF section coupled to the antenna for transmitting the signals to be radiated and receiving the collected signals, the RF section being coupled to the processor board for processing the signals received from and transmitted to the RF section.

The RF section includes a transmitter having a first D/A converter operative to convert digitized waveform samples from the processor to an analog waveform, and an upconverter coupled to the first D/A converter and the antenna through a high power amplifier for modulating and amplifying the analog signals to be radiated by the antenna. The RF section additionally includes a receiver having a down converter coupled to the antenna through a low noise amplifier for converting the signals collected by the antenna and amplified by the low noise amplifier to an IF signal, and a first A/D converter coupled to a down converter operative to convert the IF analog waveform into digitized samples of the IF waveform.

The processor board includes a digital signal processor having an output coupled to said first D/A converter for applying the digitized waveform samples to be converted to the transmitter. The digital signal processor has a digitally implemented demodulator with an input coupled to said first A/D converter for receiving and demodulating the digitized IF waveform samples. A control processor is mounted to the processing board and is coupled to the digital signal processor and user interface for controlling operation of the digital signal processor, in accordance with a plurality of individual tasks that communicate via first in/first out message queues and event flags which are on/off signals representing input, output and timing events, and wherein task execution is controlled by the event flags and presence of data in the queues.

Each mobile terminal operates in a Net Radio service configuration including a plurality of multiple user nets, each having its own channel designation (ID) which includes a specified outbound channel frequency and a specified inbound channel frequency. The Net Radio service operates in a NORMAL mode, PRIVATE mode, and a PRIORITY 1 mode call service.

In the NORMAL mode of operation, the user selects a specific net channel on which to tune and thereafter performs push-to-talk operations. In the PRIVATE mode of operation, the initiating MT user selects which other user it desires to set up a call with. Once the call has been established, a net is created where only the two authorized users tuned to the same net channel are able to communicate with one another. In the PRIORITY 1 mode of operation, the user presses a special sequence of keys to place a PRIORITY 1 call. PRIORITY 1 mode calls override any previously established Net Radio talker or speaker in order to obtain control of a specific communication channel or to initially set up a call where the desired net channel is either available or not currently active. If initially the mobile terminal is not engaged in a call, the user places a PRIORITY 1 mode call by entering, for example, '*99' on the MT handset. The mobile terminal will then transmit a Net Radio access request signalling unit message with a directory number designated PRIORITY 1 and thereafter wait to receive a channel assignment before proceeding with the call. If the mobile terminal is already engaged in a call whether it is the current talker or not, it can place a priority call by entering the special key sequence on the handset. In either case, if there are any problems initially completing the call set up, a channel search is then performed on the Net Radio channel database for an available channel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a schematic block diagram of the digital processing architecture apparatus of FIG. 1 for the voice and Net Radio modes;

FIG. 2B is a schematic block diagram of the digital processing architecture apparatus of FIG. 1 for the signaling mode;

FIG. 4 is a perspective view generally illustrative of a handset for use in connection with the subject invention;

FIG. 5 is a flow chart broadly illustrating the process of a mobile terminal initiated priority;

DESCRIPTION OF THE PREFERRED EMBODIMENT

Figure 1:
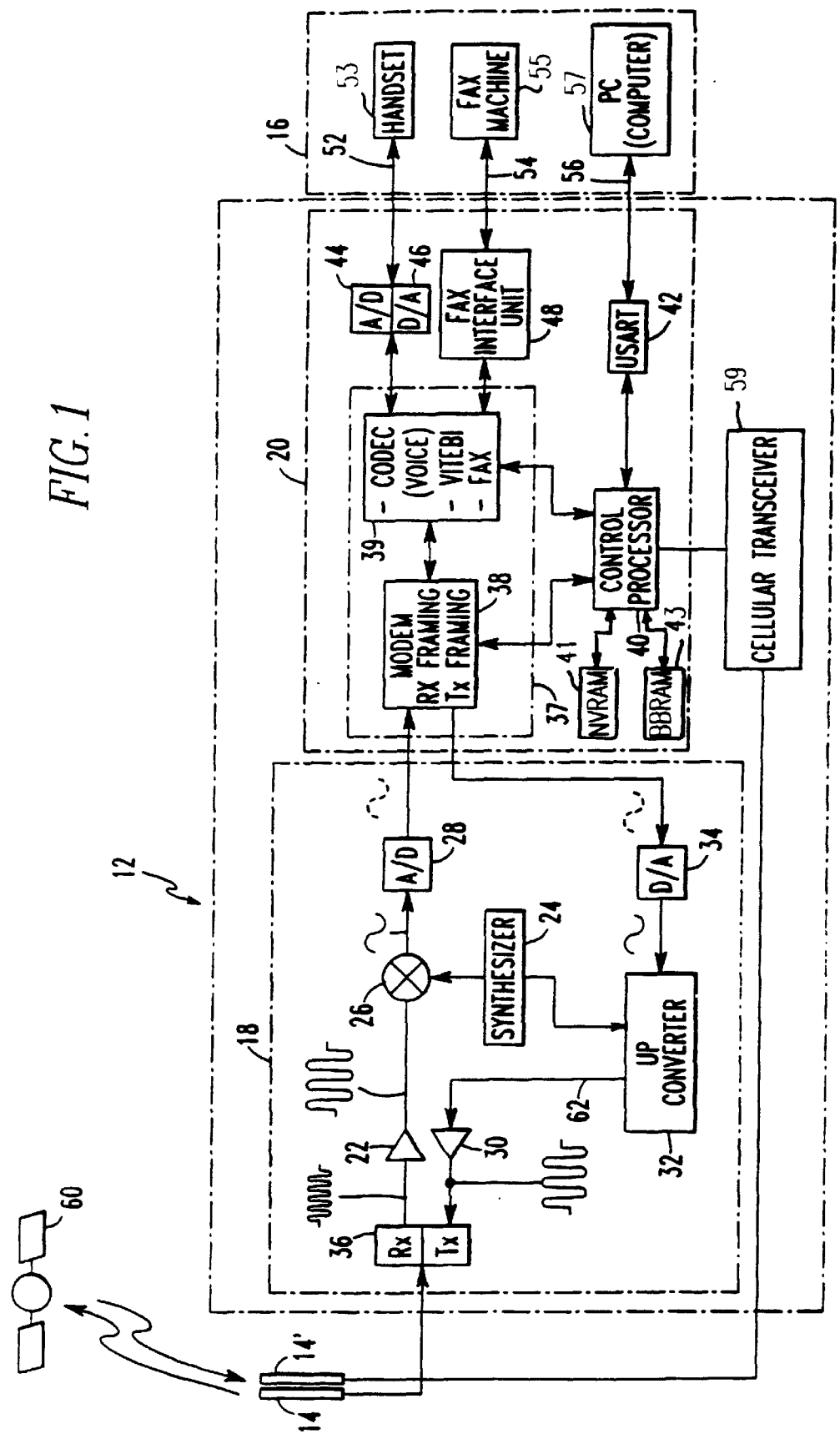
FIG. 1 is a schematic block diagram of a mobile terminal apparatus in accordance with the present invention.

Referring now to the drawings and more particularly to FIG. 1, a mobile terminal (MT) unit of the present invention is shown comprising a transceiver 12, an antenna 14, and one or more user interfaces 16. The transceiver 12 has an RF section 18 and a processor board 20. The RF section 18 has a receiving portion that includes a low noise amplifier 22, a down converter comprised of a mixer 26 and synthesizer 24, and an analog-to-digital converter 28. The RF section of the present invention also has a transmitter portion that includes a high power amplifier 30, an upconverter modulator 32, and a digital-to-analog converter 34. The antenna 14 is connected to the RF section 18 through a diplexer 36.

The processor board 20 of the present invention has a digital signal processor 37, a control processor (CP) 40 an NVRAM 41, a universal synchronous/asynchronous receiver/transmitter (USART) 42 a BBRAM 43, and a plurality of analog-to-digital converters 44 and digital-to-analog converters 46. As herein embodied, the digital signal processor 37 includes a modem digital signal processor (DSP) 38 and a codec/viterbi/fax digital signal processor (DSP) 39. The processor board 20 also includes a FAX interface unit 48.

The user interfaces of the terminal unit of the present invention include a bidirectional input/output bus 52 for a handset 53, a bidirectional input/output 54 bus for a fax machine 55 and bidirectional input/output bus 56 for connection to a personal computer 57. The apparatus may also include a cellular transceiver board 59.

The antenna assembly 14 may be one of several different types depending on the particular application of the mobile terminal unit (MT). For land vehicles, a phased array antenna, which is a flat plate of about a foot in diameter, is considered advantageous in that the gain of the antenna in the direction of the signal does not drop below 9 dB and also because the phased array is aesthetically pleasing on smaller vehicles. The antenna assembly 14 may also be a mechanical antenna which is less rugged. However, the mechanical antenna is advantageous in that it can dither at small intervals, and thus can maintain extremely accurate satellite tracking when used in conjunction with an angular position determinant. A third alternative, is an omnidirectional mast antenna which must be approximately three feet in length. For mobile terminal units with a cellular transceiver, a second antenna 14 is provided.

The MT of the present invention may be used with a geosynchronous satellite, such as 60, which has broad beam coverage over the geographical regions in which the satellite antennas are pointed. The MT transmits and receives energy to and from the satellite respectively through the one antenna 14. The most dominant feature of the satellite communication link between the satellite 60 and the antenna 14 is the extremely low satellite power that is received. The satellite 60 is assumed to be traveling in an orbit 22,600 miles, above the equator, and energy traveling this distance to the MT undergoes huge attenuation, such that power flux density incident at the MT antenna 14 is approximately −135 dB Watts/Meter$^2$, or approximately 10–14 watts per square meter as previously mentioned.

An L-Band signal which may be of a frequency between 1525 to 1550 MHz, is received through the MT antenna 14 and passed into the MT RF section 18. Since the MT transmit and receive signals may be simultaneously present, or operate in a full duplex fashion, at the antenna, they are separated into their respective paths by the diplexer 36. The diplexer 36 employs a dual bandpass filter, not shown, with one filter tuned to the transmit band and the other filter tuned to the receive band of frequencies. Thus, the diplexer 36 steers the receive signal into the receive path. The signal exits the diplexer 36 and is then amplified by the low noise amplifier 22 before it passes into the next RF stage. The low noise amplifier 22 boosts the power level of the original signal and sets the noise level of the receiver to a minimum. In other words, the amplifier 22 establishes the noise figure of the MT receiver. The amplified L-Band receive signal exits the low noise amplifier 22 and is mixed down or in other words down—converted to a low intermediate frequency (IF) signal by the mixer 26 and synthesizer 24 and then sampled by an analog-to-digital (A/D) converter 28. This provides an output in the form of digitized IF waveform samples which are coupled to the processor board 20.

The transmit signal begins in the processor board 20 as digital data, which is then converted into digitized, modulated waveform samples. This digitized waveform, which is created by the processor 37 is conducted to the digital-to-analog (D/A) converter 34 before the quadrature, modulator up-converter 32 of the RF section. The converter 32 converts the digitized waveform into both an analog I (in phase) and Q (quadrature) waveform. The analog I and Q waveforms are then sent to a mixer or up-converter quadrature modulator, not shown, where they are upconverted to an L-Band, and then summed to form a low level L-Band transmit signal on signal line 62. This low level L-Band transmit signal is amplified by the high power amplifier 30. The resulting high level L-Band transmit signal then passes through transmit side of the diplexer 36 and is steered towards the MT antenna 14 from which it travels to the satellite 60.

Considering the operation of the processor board 20, the DSP 38 reads the received signal waveform samples from the A/D converter 28, and processes these samples as they arrive. The L-Band received signal must be mixed down to a low IF frequency to aid in signal filtering and also to slow down the A/D sample rate so that the digital signal processing can keep up with the sample arrival rate. Once the receive signal has been sampled and loaded into the DSP 38, all subsequent signal processing is performed by the DSP 38 and DSP 39 as controlled by the control processor 40. Received signals are demodulated, in other words translated from their waveform representation into their digital data representation, decoded and packaged for voice, fax or data processing at the DSP 39. The signal degradations of the high altitude satellite are mitigated by the channel protocol and data encoding scheme herein described. For example, repeat strategies, a combination of forward error correction, interleaving and scrambling, all aid in minimizing and spreading the effect of errors on the channel. The demodulator of the digital signal processor 38 achieves signal acquisition and tracking under degraded receive signal conditions. All of these functions are implemented digitally in software within the processor board 20 of the MT.

The control processor or CP 40 performs byte level and waveform manipulations while the DSP's 38 and 39 perform bit level and waveform manipulations. The DSP 38 implements the modem as well as the real time satellite framing function that includes circuit switched, and signaling frame formats together with low level bit manipulation algorithms. An executive loop provides overall control and call sequence around which the processing functions are built. Interrupt Service Routines (ISR) are used to feed the signals from the DSP 38 to the DSP 39, and from the DSP's 38 and 39 to CP 40 communication interfaces.

As herein embodied and referring to FIG. 2A, which illustrates the processing architecture for the voice and Net Radio modes, the signal processor 37 as noted above is comprised of two individual DSPs 38 and 39. The digital signal processors 38 and 39, which are preferably of the fixed point type, run at a clock speed of approximately 27 MHz. At one instruction per cycle, these DSPs provide 27 million instructions per second of processing throughput. Each such digital signal processor is preferably of the type manufactured by Texas Instruments known as a TMS 320C51 type Digital Signal Processor. The control processor 40, is preferably a microcontroller of the type manufactured by AMD and which is identified by model 29200.

The DSP 38 as shown in FIG. 2A includes a demodulator portion 64, a receive framing portion 66, a modulator portion 68, and a transmit framing portion 70. The DSP 39 includes a decoding portion 72 and an encoding portion 74.

The demodulator 64 includes a buffer 76, Hilbert transform portion 78, and a symbol detector 82. The receive framing portion 66 includes a Unique Word (UW) correlation frame synchronizer 84, a voice subframe buffer 86, a descrambler 88, and a feed serial interface 90.

The modulator 68 includes a quadrature phase shift keying modulator. The transmit framing portion 70 includes a data bit buffer 96, a differential encoder 98, a scrambler 100, a forward error correction encoder 102, a frame formatter 104 and a voice subframe (VSF) buffer 106.

In a circuit switched (CS) voice mode, hereinafter referred to as the Voice Single Channel per Carrier (SCPC) Mode, the MT of the present invention operates in a full duplex mode, simultaneously transmitting and receiving voice mode frames. The timing of the transmit and receive satellite channels are, moreover, asynchronous to one another.

In operation, the demodulator 64 receives the digital samples of the waveform from the A/D converter 28 after being shifted to a low intermediate frequency (IF) as previously described in connection with the RF section 18. This buffering takes place at function 76 via a software interrupt service routine (ISR) which is triggered by an interrupt from the A/D hardware each time a 16 bit sample is present. While samples are being accumulated by this background process, the executive or main loop of the DSP 38 which is hereinafter described, continually monitors this process to see if enough samples have arrived to begin the receive chain processing.

In processing the blocks of samples, the Hilbert Transform subfunction 78 shifts the real signal to a complex IQ baseband signal. Because this baseband signal can be affected by Doppler shift, and because there is an inherent receive frequency error due to drift between the reference oscillators of the mobile terminal and the ground station channel unit (CU), a frequency correction factor is fed back to the Hilbert Transform from the frequency tracker or correction function located in the symbol detector or detection function 82. Outputs of the Hilbert Transform function are written to the in-phase (I) and quadrature (Q) phase input buffers of the detector 82. The detector 82 in conjunction with a matched filter recovers the shape of the QPSK symbols from the received waveform and aids in symbol tracking or timing. The detected symbols in the form of soft decisions (8 bit signed magnitudes) are output to the receive framing function 66.

The main purpose of the receive framing function 66 is to unpack the information data contained within the satellite frame. The receive framing function 66 is commenced each time a block of 16 symbols has accumulated. In the voice mode, the receive framing function 66 detects frame boundaries in the data stream at function 84, buffers subframes at function 86, and then descrambles each of the voice subframes (VSF) or signaling units (SUs), as the case may be, at 88. As opposed to a voice communication signal, a signalling unit, hereinafter referred to as an SU is a message sent or received containing a command to be carried out or a response to a command. The frame boundaries are located by the UW correlator/frame synchronizer 84 which performs an auto-correlation on a 24-bit frame marker sequence UW. Processed VSFs or SUs (128 soft decisions) from the function 84 are buffered at 86 and fed serially after being descrambled at function 90 to the DSP 39. This serial feeding is accomplished by an ISR of DSP 38.

The decode function 72 of the DSP 39 includes a soft decision buffer 108 which is fed by serial receive ISR. This routine reads one word (16-bits of data) at a time and sets a flag when a complete subframe has been buffered. A voice decoder function 110 is called every 20 milliseconds regardless of whether a Received Voice Subframe (VSF) is present since the voice decoder 110 is a slave to voice transmit timing. If a received VSF is present, it is input to the voice decoder function 110. If a VSF has not yet arrived due to the asynchronous nature of the satellite transmit and receive chains, or, if a SU has been substituted for a VSF, the voice decoder 110 is called with the subframe repeat flag set. This allows the voice decoder to maintain its timing and signal history even when a VSF is not available for decoding. The voice decoder 110 outputs 20 ms worth of digital samples to a D/A buffer 112. These samples are fed to the D/A serial interface by the ISR associated with the D/A 112. If a signal unit SU is present, a Viterbi decoder 114 is activated after the voice decoder 110 completes its function. The Viterbi decoder 114 reverses the forward error correction (FEC) and coding applied to the data at the transmitter and also attempts to correct bit errors. Viterbi decoded SUs (96 "hard" bits) are read from the SRAM of the DSP 39 by the control processor 40 in response to an interrupt from the DSP 39 as shown at line 116 of the Viterbi decoder 114.

The analog signal samples from the MT handset 52 (FIG. 1) are digitized by the A/D converter 44. The 8 KHz digital samples of the analog waveform originating from the handset 52 are buffered at 118 with the ISR associated therewith. Each time 20 ms worth of samples are collected, the Executive Switch SW of the DSP 39 activates a voice encoder function 120. This voice encoder function performs what is termed an improved multiband excitation (IMBE) digital signal processing algorithm to convert the information in these samples to a compressed 128 bit voice subframe (VSF). The VSF and a SW flag, indicating whether voice activity is present in this subframe, or in other words whether or not the user is currently speaking, are transferred to a serial transmit buffer 122. The ISR associated with this buffer transfers the data across a serial interface to the DSP 38. As each 16-bit word of the VSF data is received by the DSP 38, an interrupt is triggered which causes the ISR associated with the buffer VSF function 106 to transfer the data to VSF input queue of the transmit framing function 70 of the DSP 38.

The primary purpose of the transmit framing function 70 is to package information data, both VSF and SU, into a voice mode satellite frame format. While there is voice activity, the frame format data function 104 builds voice frames consisting of a 24-bit frame marker unique word (UW) sequence followed by six VSFs or 5 VSFs and a signaling unit (SU). SUs which are used to convey system control information are passed to DSP 39 from the CP 40. These SUs are three-quarter rate forward error correction convolutionally encoded at 102 before they are scrambled at 100, and differentially encoded at 98. VSFs bypass the encoder in DSP 38 since they are block encoded by the voice encoder 120 in DSP 39. Unique Word (UW) sequences bypass all but the differential encoder as seen at line 121. All processed bits are output to the transmit buffer 96 which feeds the modulator function 68.

The final software function of the transmit chain, the modulator 68, is fully contained in the ISR associated with the modulator, which runs at the sample rate of the D/A converter. This function shifts symbols from the 16-bit words in the transmit buffer 96. For each symbol, eight complex base band samples are read from a lookup table, not shown, to produce a filtered QPSK symbol at the input of the digital to analog converter 34. Samples of each symbol are fed to the D/A hardware 34 of the MT. In addition, transmitter control is output by the modulator 68 at the start and end of each burst to perform on/off control of the high powered amplifier in the MT transmitter hardware.

In FIG. 2B, which illustrates the processing architecture of the digital signal processors 38 and 39 in the Signaling mode, the same reference numerals for the function similar to FIG. 2A apply. For the sake of brevity, similar functions will not be repeated in this description. As previously described, MTs are in the signaling mode when not engaged in a single channel per carrier, i.e. SCPC call. Thus, this is basically an idle mode where the MT monitors an Outbound Time Division Multiplexed Channel (OB TDM) sent from the Group Controller (GC) of the communication system. The MT receives configuration information as well as incoming call SUs on this channel. The MT transmits on a plurality of different frequency signaling channels as part of a call setup procedure or to respond to polls from the GC.

Further as shown in FIG. 2B the demodulator 64 functions the same as the SCPC mode demodulator of FIG. 2A with the additional capability of providing a clock source for timing transmit bursts as shown on line 83. This clock is needed since unlike the SCPC mode, the receive and transmit timing are tied together in the signaling mode. The clock is updated by the demodulator 64 at the symbol rate (3375 Hz). Then each time the demodulator passes a block of symbols to receive the receive framing 66, it also passes the symbol clock time stamp associated with the first symbol in each symbol block. The receive framing 66 processes the OB TDM of the GC. The receive deframing performs the UW correlation function at block 84 and then descrambles and deinterleaves at block 86' and 88'. Upon the detection of Unique Word UW at block 84, the receive framing also calculates the symbol clock time associated with the first symbol of the UW pattern by adding an offset to the clock time passed to it by the demodulator 64 over line 83. This offset reflects where in the symbol block the UW actually started. The calculated time stamp is then stored in memory for use by the transmit framing 70, because transmit bursts are timed relative to the starting edges of the received OB TDM frames.

To complete the receive chain processing, the data is Viterbi decoded by the DSP 39. The decoded SUs in the signaling mode are passed to the CP 40 for processing by the upper protocol layers.

The transmit chain of the MT operates in a "burst" mode. In other words, the transmitter idles until an SU in the signaling mode is queued by the CP 40 for transmission by the DSP 38. When the data arrives in the transmit queues at block 104' the transmit framing prepares the data for transmission at block 106' by applying forward error correction or FEC encoding at 102', interleaving at 101', scrambling at 100' and differential encoding at 99' to the data bits. The data is framed according to the burst type specified by the CP 40. In the present embodiment, there are two different frame formats used in the signaling mode.

The transmit framing 70 determines when the packet should be transmitted. This decision depends upon the transmission protocol that is utilized for a particular burst type. There are two different transmission protocols used by the transmit framing. One is the slotted well known Aloha and the other is the time domain multiple access or TDMA. In the signaling mode, the slotted Aloha is used for access requests initiated by the MT while TDMA is used to respond to the GC at a specific scheduled allocation time.

To schedule slotted Aloha bursts, the transmit framing 70 must calculate the next available slot edge. Slot edges are defined relative to the received OB TDM frames. The transmit framing uses the frame start time stamp provided by the receive framing as previously mentioned along with the symbol clock being ticked by the demodulator 64 to determine where it is in time relative to the start of the current OB TDM, and thus where the next closest slot edge will occur. The clock tick associated with the slot edge is used as the start time for the burst.

For TDMA allocations, in the signaling mode, the TDMA slots (120 ms in width) line up in time with the OB TDM slots. By definition the response to an SU received in an OB TDM frame must be responded to 120 ms after the end of the OB TDM. Once the transmit framing determines the burst start time, the burst stop time is calculated as the start time plus the length of the burst in symbols. These times are passed to the modulator 68 along with the transmit data frames. While the modulator 68 is in an idle mode, it compares the current symbol clock time to the burst start time. If the times match, the modulator 68 enables the high power amplifier 30 (FIG. 1) and begins outputting samples to the D/A converter 34. While the modulator is producing samples, it compares the burst stop time to the current symbol clock time at the end of each symbol. When the times become equal, the modulator 68 turns off the HPA 30 and goes back to the idle state. In the signaling mode, the modulator 68 also issues an interrupt to the CP 40 when a burst terminates. This information is used by the CP 40 for burst duration monitoring which is part of the BIT hereinafter described.

The following description is applicable to all of the various operating modes of the MT of the present invention.

The responsibility of the demodulator portion of the DSP 38 is to convert the satellite received samples to packets of "soft" bits which are routed to the DSP 39 for further processing. On the transmit side, packets of bits are converted to digital samples by the modulator for transmission over the satellite link. Thus, the demodulator 64 and the modulator 68 are, in fact, a bidirectional pipeline process which is time intensive and one dimensional from a functional standpoint. In accordance with the present invention, the functions of the modulator, demodulator portion of the DSP 38 is operated from a main or executive loop instead of using an operating system. This has the advantage of reducing cost and minimizing execution cycles and memory. However, without an operating system, the timing requirements of the four functional partitions, that is, the demodulator 64, the receive framing 66, the modulator 68, and the transmit framing 70 are such that the routines are allowed to run to completion. This is accomplished by operating the demodulator 64 and the receive framing 66, sometimes referred to as a receive chain, on a block basis, or in other words, on a basis of multiple samples or bits. This operation is in contrast to operating the demodulator and receive framing on each sample or bit as it arrives. The block basis operation permits both the receive and transmit chains to run to completion before the next block of samples arrives. In the preferred embodiment, the chosen block size is 32 bits (sometimes referred to as 16 symbols) which at a 6750 bit-per-second transmission rate is equivalent to 32/6750 or 4.74 microseconds per each block.

Because of the different processing requirements for the variety of services provided by the MT of the present invention, the 2400 baud FAX/Data, 4800 baud Data, Voice, and Net Radio services, the particular software of DSP 38 is capable of being switched by the CP 40 between an SCPC mode (or "call" mode) and the signaling mode. These modes are referred to as "major" modes of operation in the DSP 38. The executive loop for the DSP 38 provides maximum flexibility and minimum switching delay between modes by monitoring for major mode commands from the CP 40 during every operation of the loop. This permits a major mode switch to be detected within 4.74 microseconds and avoids the necessity of downloading separate software to the DSP 38.

Figure 3:
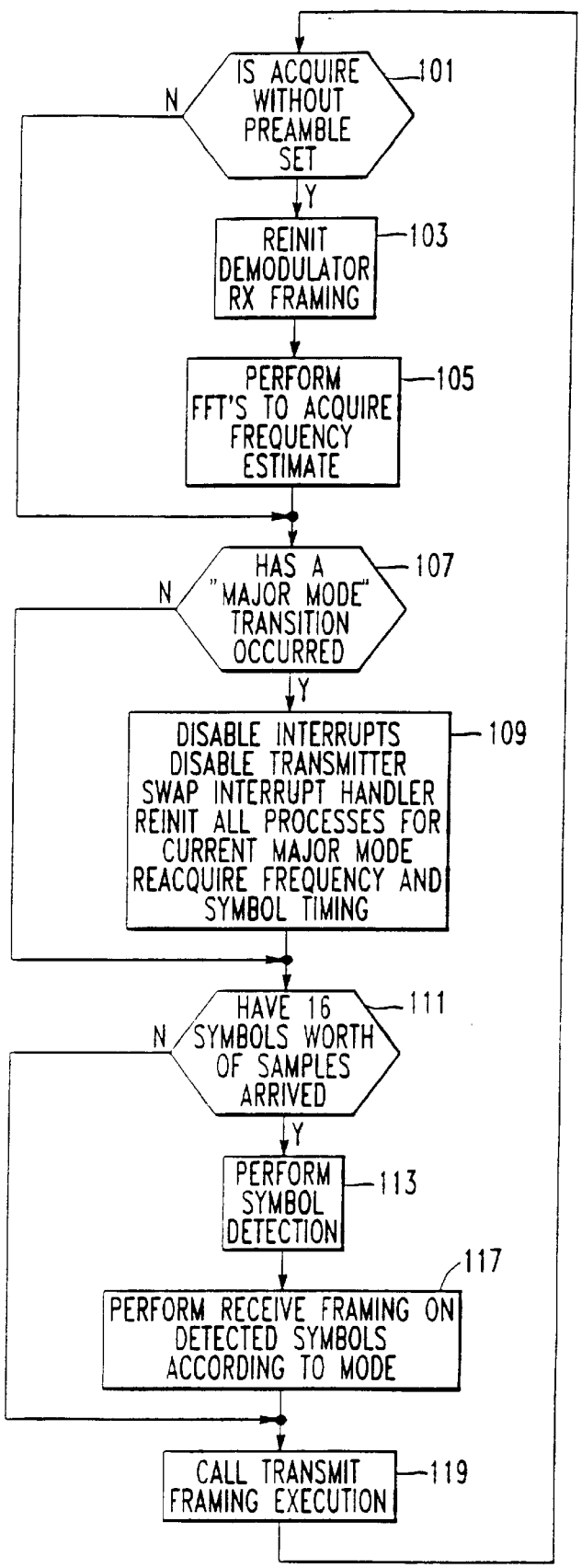
FIG. 3 is a flowchart illustrating the executive loop for the modem function of FIGS. 2A and 22.

Referring now to FIG. 3, when DSP 38 is operating within a "major" mode, a flag referred to as an "acquire without preamble" flag can be set as indicated at decision block 101 which causes the demodulator 64 and the receive framing 66 to be reinitialized at function block 103. Then, FFT's are performed to acquire the frequency estimate as indicated at function block 105. Thus, while the DSP 38 is operating within a major mode, it can be commanded by the CP 40 to reacquire the receive signal. This may occur during the signaling mode when the MT needs to switch frequency channels due to signal strength degradation or signal fades or blockage. This could happen if the MT user drives through a tunnel, for example. The CP 40 detects these conditions by monitoring the received packet error rates and frame lock information provided by the received framing function 66. When appropriate, the CP 40 will pass the reacquire receive signal command to the DSP 38. The next executive decision is made at block 107 as to whether or not a major mode transition has occurred. If such a transition has occurred, the executive loop then disables interrupts, disables the transmitter, and switches the A/D interrupt handler address to correspond to the switched mode. In addition, the loop reinitializes all of the processes for the current major mode and reacquires the frequency and symbol timing, all as indicated at function block 109.

Following the major mode decision block 107, a decision is made at block 111 as to whether 16 symbols of samples has arrived at the input to the buffer 76 of the demodulator 64. If the samples have arrived, symbol detection is performed at block 82 of the demodulator 64 as indicated by function 113 of the executive loop. Then, the sixteen detected symbols are processed by the receive framing function 66 as indicated by function block 117 of FIG. 3.

The transmit framing function 70 is called each executive loop time for execution at block 119. When the transmit framing executive program is called at block 119, the decision to run the transmit framing function is made within this executive program, and is based on whether or not it is time to feed the modulator function 68 additional bits from the buffer 96. The receive and transmit functions in the DSP 38 are switched to submodes that exist within the SCPC major mode. These submodes are monitored in the respective executive loops of each of the processes. This efficient sequence of operations minimizes the reaction time of the MT to losses or degradations.

In the MT of the present invention, the CP 40 together with a non-volatile random access memory (NVRAM) 41 and a battery back up random access memory (BBRAM) 43 provide the overall executive control of the functions and interfaces of the MT of the present invention. An executive program for multi-tasking preferably comprises the operating system known as the Nucleus RTX developed by Accelerated Technology, Inc. However, such an operating system may be of any type that is capable of performing the functions of the present invention.

In accordance with the present invention, the CP 40 performs system initialization, mode selection and control.

In the mobile terminal of the present invention, the CP 40 utilizes a commercial multi-tasking executive operating system in addition to a time management system to control the various tasks. All of the tasks of the control processor are independent, concurrent programs. The use of this multi-tasking reduces the number of parts and the cost of the MT by permitting a single processor to replace multiple processors. The time management of the present invention provides efficient shared use of timer hardware. The CP 40 includes tasks that communicate through first in/first out message queues and event flags, which are on/off signals representing input, output, or timed events.

Only two interrupt levels are used in order to provide flexibility in processor selection. Events are driven by external interrupts from the DSPs 38 and 39 for transmit and receive data on the satellite side of the MT, and from the handset, DTE, or fax ports on the user side of the MT. The DSP events, which cause an interrupt 3, are associated with data received from and transmitted to the satellite link. The handset, cellular radio and fax events generate the interrupt 3; and the data port and BSC events generate the interrupt 2. The interrupt service routines (ISR's) are not formal tasks, but interact with the tasks by setting event flags based on the source and specific cause of the particular interrupt.

The individual tasks performed by the control processor 40 include, inter alia:

(1) BIT

The task BIT checks the nonvolatile memory checksums, the stuck on/off status of the transmitter, the high temperature status of the transmitter, the transceiver unit temperature, the availability of the handset, data, and Fax ports, the beam steering controller (BSC) status, monitors transmit burst duration, and resets the watchdog timer.

(2) BSC I/F

The BSC I/F task coordinates the steering of the antenna main beam toward the satellite, processes the beam steering controller control messages and formats commands to the BSC, receives signal strength updates from the DSP demodulator and forwards the signal strength to the BSC and responds to BSC status changes.

(3) Channel Manager

This task performs a manual or automatic signaling channel selection, monitors the signaling channel performance, requests the TDM channel logon when required, performs the TDM channel change when necessary for beam cross over, and updates the system table to reflect changes in signaling channel status.

(4) Codec I/F

This task sets the channel type and mode for Codec DSP, checks the CRC for the group controller channel signaling unit, reports the CRC performance to channel manager task, reports the channel status to the Signaling Protocol task, calls the signaling units by the destination ID, routes circuit switched signaling units to MGSP (hereinafter described) or the Signaling Protocol task, routes the packet data units to the CAC task, and routes the received circuit switched data frames to the data IF task.

(5) H/S

This set of tasks processes the keystrokes from the handset, services requests from other tasks to display indicators and text on the handset, arbitrates call requests/announcements among the handset, and satellite modem, implements special features invoked by handset such as store/recall number, call timer, handsfree operation, and the like. In addition, this set of tasks controls the entry/display of configuration values such as enabled options, serial port data rate/character format, and operating mode.

(6) INIT

This task bootstraps the CPU, initializes on-chip peripherals, initializes external peripherals, performs diagnostics, restores power-down configuration, downloads the DSP's 38 and 39, and coordinates the task start ups.

(7) Int 2 ISR

This task sets the event flags indicating the source of the interrupt such as the BSC port, data port, for example, and controls the USART data transfers and buffering.

(8) Int 3 ISR

This task sets the event flags indicating the source of the interrupt such as the modem DSP, Codec DSP, handset, and other hardware devices. It also controls the transfer and buffering of data to and from external devices such as the DSP memory, and custom serial interfaces.

(9) MGSP

This task manages signaling transactions between ground station group controller and the MT for circuit switched service and controls the channel selection, channel access, slot timing, error recovery, and congestion.

(10) MODEM I/F

This task processes the modem DSP request (interrupt) to tune the frequency synthesizer, relays and buffers the circuit switched transmit data between the data I/F task and the modem DSP, receives transmit signaling units from the MGSP and Signaling Protocol tasks, buffers and forwards to the modem DSP 38. This task also buffers and forwards status and data to the modem DSP and updates the received channel status (unique word correlation/frame synchronization and signal strength) to the Signaling Protocol, Channel Manager, and BSC/IF tasks.

(11) SIGNALING PROTOCOL

This task processes the signaling units and control messages, performs Net Radio call setup and tear down protocols for a variety of call types, processes Net Radio advance service features such as dial out service dispatcher, maintains bulletin board data received from ground stations, processes MT and network management messages, monitors call status, updates the state of the MT based upon call progress, bit results, management messages and inputs from peripheral devices (handset), and responds to abnormal conditions such as lost calls and hardware faults.

The various tasks as outlined above are executed upon receiving data in the queue of the particular task. In the event that more than one task is queued simultaneously, they are activated in accordance with a predetermined priority.

Net Radio Service

This now leads to a consideration of the subject inventive concept which is directed to the operating modes and, more particularly, to an improved PRIORITY 1 mode of the NET RADIO service configuration implemented in each mobile terminal (MT).

Briefly and as noted above, Net Radio service comprises a trunking system which permits private communications between an MT end user and groups or sub-groups of other MT users or an individual MT user which is part of the same group. Net identifications, i.e. IDs, are utilized so that a net ID can represent either a group, sub-group or an individual. Each net, moreover, is assigned a channel of a plurality of designated channels, for example 16 channels over a predetermined frequency band, where each channel is assigned one specific frequency for outbound communication and another specific frequency for inbound communication.

Each MT, moreover, while in a Net Radio service configuration, can operate in: (1) a NORMAL mode; (2) a PRIVATE mode; or (3) a PRIORITY 1 mode call service set up. Under NORMAL mode operation, the user selects a specific net and accordingly the one which to tune to and thereafter performs push-to-talk (PTT) operation. Under PRIVATE mode operation, the initiating MT selects which other user it desires to set up communication with. Once the call has been established, only the two authorized users tuned to that specific net channel are able to communicate with each other. Under PRIORITY 1 mode operation, the user enters a special key sequence such as '*99', to place a priority call which acts in an emergency situation, for example, to override and interrupt a Net Radio call in progress in order to obtain control of a specific net or to initially set up a call where a desired net is either available or is not currently active.

Net Radio service is initiated by pressing function keys 61 of a handset 53 such as shown in FIG. 4. By pressing the "FCN" button of keys 61, and the button designated for comm mode of the keys 71 to bring up a COMMUNICATIONS mode (COMM MODE) selection, the user then scrolls by means of up or down arrow keys 63 and 65 until the words "Net Radio" appears on the handset's display 67. Another button of keys 61 identified as the storage (STO) key, is then depressed. Next, the "RCL" key of keys 61, followed by the up or down arrow keys 63 and 65 is used to select which channel of a plurality of nets to tune, with the net ID being displayed by the handset display 67.

As long as the user keeps hitting up or down arrow keys, previous/subsequent net IDs will be displayed but the MT does not re-tune to a specific channel until no key press activity occurs for several seconds or the user presses the "STO" key of the keys 61. At this point, the scroll mode ceases and the MT re-tunes to the newly selected net. Hitting a clear (CLR) key of the key 61 terminates the scroll mode without changing nets. Alternatively, the user can hit a recall (RCL) key of the key 61 and a two digit number from the set of numerical keys 71 to initiate the scroll mode at the memory location identified by the two digit number.

A push-to-talk (PTT) function is achieved by the use of either of two separate buttons of the numerical key set 71. This is not possible on a typical cellular handset. In the subject invention, however, a user can use either the number "1" key or the number "3" key as a push-to-talk button with the "1" key typically being used by left handed people and the "3" key being used by right handed people. If the MT is currently tuned to an active net, this will cause it to attempt to become a new "talker". Otherwise, an attempt is made to bring up the last net that the user selected.

Certain operations, e.g. adding or deleting a dial-up dispatcher, can only be initiated by the MT that is the current talker. However, the only way that an MT can be the current talker is if either the PTT button "1" or "3" is depressed. Handset limitations make it impossible, however, to press two or more keys at the same time, which is necessary for the speaker on the channel to add or remove a dispatcher. The subject invention, however, provides a scheme to simulate this function. Accordingly, if the used PTT key is released after being pressed and then pressed again within a half of a second, the PTT function is considered to be "locked", which means the user can now release the key and the MT will act as if it is still depressed. While the "PTT lock" feature is active, the user can then press other keys such as "**" or "##" which is required, for example, to add or remove a dial-up dispatcher. Pressing either the "1" to "3" PTT key again will release the "PTT lock" and the key will be considered depressed only as long as it held down by the user. The user can also hit the "CLR" to cancel the "PTT lock".

The PRIORITY 1 mode and its method of acquiring a net channel will now be described. If the MT is initially not engaged in a call, the user can simply place a PRIORITY 1 mode call by entering a special key sequence, for example, "*99" on the handset 53 (FIG. 4). The MT will transmit a Net Radio "access request" SU with a directory number designating PRIORITY 1 and then wait to receive a channel assignment SU message signal before proceeding with the call. As noted earlier, an SU is a message sent or received by the MT or communications ground segment (CGS) containing a command to be carried out or in response to a command. If the MT is already engaged in a call, whether it is the current speaker or "talkers" or not, it can still place a PRIORITY 1 call by entering "*99" on the handset 53. In either case, if there are any problems encountered in initially completing the call set up, a search is then performed on the Net Radio channel database for an available channel. The following description and flow charts shown in FIGS. 5, 6 and 7 describe this process in greater detail.

Referring now to FIG. 5, the mobile terminal (MT) is assumed not to be engaged in a call. As such, it is running in an idle state monitoring the handset 53 (FIG. 1) for user requests as well as the system's Group Controller signal (GC-S) channel, which is an incoming signal channel, for any signaling unit (SU) activity and signal strength. The user places the MT into net radio mode, which enables the idle process to accept net radio channel assignment SUs. At this point no net IDs or channels have been selected. However, the user can make a PRIORITY 1 call by entering *99. This corresponds to step 200 in FIG. 5. A Net selection determination for placing a PRIORITY 1 call is next made per step 202. A valid selection query is then made per step 204. If a valid net was identified, a Net Radio access request SU is generated at step 206. Although not shown in FIG. 5, this involves checking a default PRIORITY 1 mode flag and a default PRIORITY 1 mode tag, which are both user selectable. This flag is used to determine which net to initially attempt to place a PRIORITY 1 call. If this flag is configured to always use the default PRIORITY 1 mode tag, then regardless of the state of the current call, the MT will always re-tune to the GC-S channel and attempt to place a PRIORITY call on the net specified by the default PRIORITY 1 mode tag. If the default PRIORITY 1 mode flag is configured to allow the current net selected to be used during the initial attempt, then the currently selected net will be tried, followed by the default PRIORITY 1 mode tag. If either of these attempts fail to successfully set up the PRIORITY 1 mode call, then depending on the setting of a PRIORITY 1 automatic net search flag, the MT will either return to an idle state or search through the complete list of available nets located in a Net Radio database located in a non-volatile (NVRAM) 41 (FIG. 1) to try and place the PRIORITY 1 mode call. The search starts with the first net channel ID tagged '1' and ends at the last net channel ID tagged '15'. If a valid net channel is found during the search, then a PRIORITY 1 mode call is attempted on that net. If no valid net IDs are found or none of the net IDs already tried resulted in a successful call setup, then the priority call setup attempt is terminated and control is transferred back into the idle state as shown by reference numeral 208. The PRIORITY 1 automatic search flag is also configured by the user and stored in NVRAM 41.

For each net channel retrieved from the Net Radio database, the Net Radio access request SU 206 is transmitted, specifying the Net ID and designating PRIORITY 1 mode by setting a directory number to 'E911'. A loop including steps 210 and 212 with an exit time-out is then entered while waiting for the reception of a channel assignment SU. The channel assignment SU informs the MT on which frequency to obtain the PRIORITY 1 communication channel. If the MT receives this SU prior to the expiration of the loop time-out, then the MT will tune to the designated communication channel, termed a feeder link earth station communications (FES-C) channel per step 214. However, if the MT does not receive the channel assignment SU prior to the expiration of the loop time-out 212 and the PRIORITY 1 automatic net search flag is configured to allow searching through the database, then the MT will retrieve the next available net ID stored in the Net Radio database and attempt again to place the PRIORITY 1 mode call on that net.

Once the MT has received a channel assignment and tuned to the FES-C channel which is an outgoing communication channel, a second time-out loop including queries 216 and 218 is entered waiting for a command message Net Radio SU (NRSU). This SU at 216 informs the MT which speaker ID of another MT is currently in control of the Net. If the MT receives a Net Radio signal unit (NRSU) prior to the expiration of the loop time-out, then the MT will proceed into a Net Radio MONITORING state indicated by reference numeral 220 and further disclosed in FIG. 6. However, if the MT does not receive a NRSU prior to the expiration of the loop time-out at 218, then the MT will re-tune to the group controller signal or incoming signal GC-S channel as shown by reference numeral 222. If the MT has been configured to search for other available nets, then the entire Net Radio database containing all available Nets is searched for a Net ID in which to place the priority call.

If the MT has not been configured to search for other available nets, then the priority call setup attempt is terminated and control is transferred back into the idle state.

Figure 6:
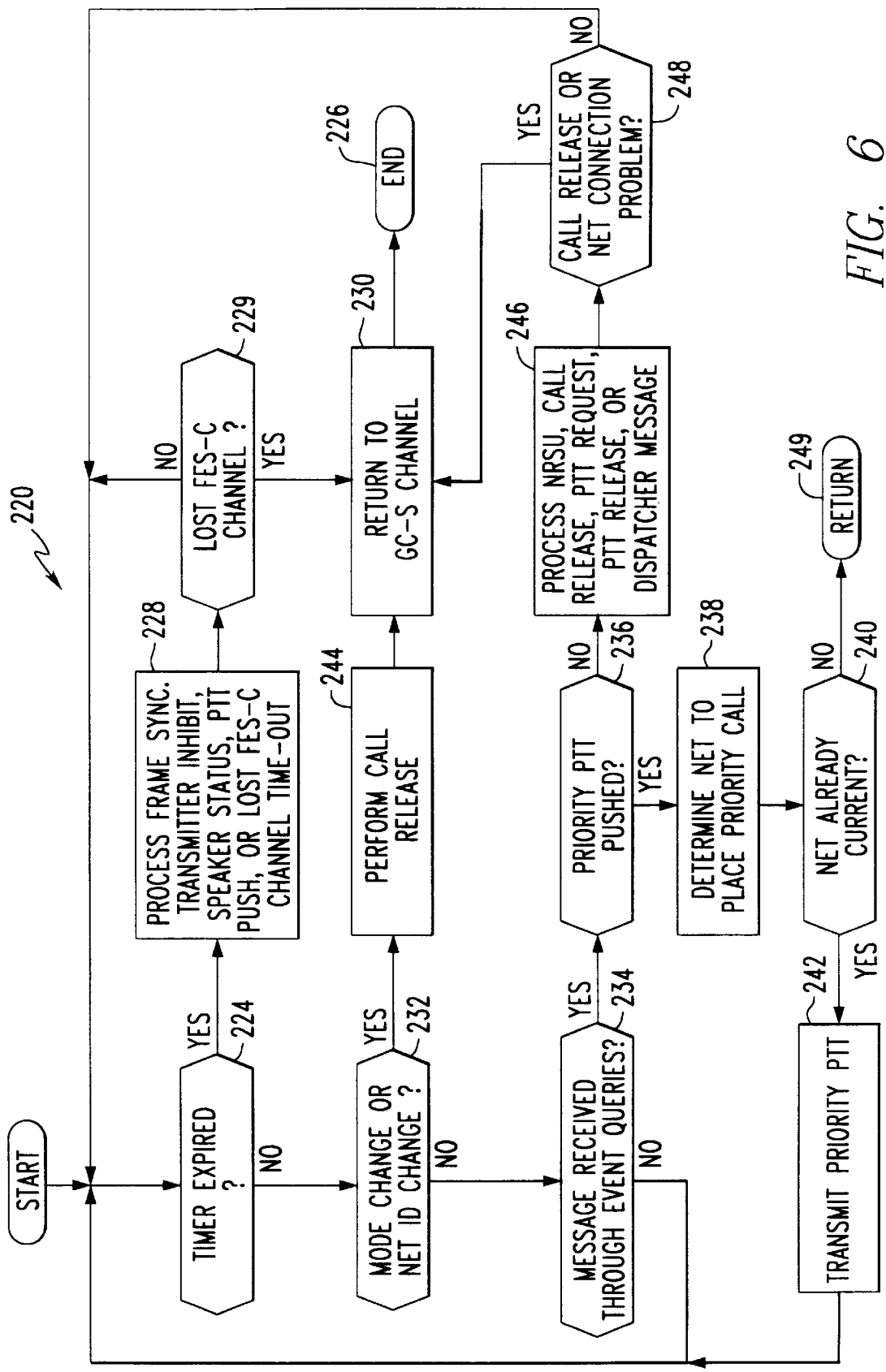
FIG. 6 is a flow chart illustrating the Net Radio call monitoring procedure shown in FIG. 5.

When the MT enters the Net Radio MONITORING state at 220, it will continuously check for signalling unit messages (SUs) received from the ground station, MT/channel status mechanized via various timers, and user associated events as depicted in the flow chart shown in FIG. 6. All SUs are passed in through an event queue as they are acquired in the DSP's 38 and 39 and then routed to the CP 40 (FIG. 1). Timers are used to monitor the reception of unique words (UWs), NRSU's and Command Acknowledge SUs.

As shown, specific operations will be performed depending on the type of SU received and its contents. NRSU's are monitored to determine the quality of the channel. If there are no NRSUS received within a predetermined amount of time, as indicated by reference numeral 224, then the MT will re-tune to the GC-S channel and end the call, returning to the idle state per step 226 through steps 228, 229 and 230. If no NRSU's are received within a predetermined amount of time, then the MT will declare the speaker ID status to be unknown and disable transmissions on the Net per step 228. When the MT is currently the speaker, indicated by the speaker ID field of the NRSU, and requests the dispatcher setup, the MT will wait for a predetermined amount of time for an acknowledgment from the ground system. If the acknowledgement is not received before the loop timer expiration for the dispatcher setup, then the user is notified and the transaction is labeled unsuccessful.

If no mode change or net ID changes have occurred as shown by reference numeral 232, and SUs have been received through the required event queries per query 234, PRIORITY 1 mode PTT request at 236 and 238 from the user will cause the MT to determine per query 240 which speaker ID currently has control of the channel. If the MT has control of the channel and the default PRIORITY 1 mode flag allows the current Net selected to be used, then it will transmit a PTT request SU (step 242) with the call type set to PRIORITY 1.

If the default PRIORITY 1 mode flag does not allow the current selected Net to be used, then regardless of whether the MT has control of the channel or not, the MT will re-tune to the GC-S channel via steps 249 of FIG. 6 and 222 of FIG. 5. The process performed then follows that previously described with respect to FIG. 5. If the MT does not have control of the channel, then the MT will return to the previous state and re-tune to the GC-S channel via steps 249 (FIG. 6) and 222 of FIG. 5.

The manner in which the control processor (CP) 40 controls the DSP 38 and DSP 39 in FIG. 1 is called physical layer processing. Physical layer processing in the mobile terminal MT in accordance with the present invention involves four main processes: 1) modulation of the transmit signal and demodulation of the receive signal, 2) transmit framing, 3) receive deframing, and 4) digital signal processing of voice data. These processes, implemented in software, specifically C and assembly languages, are outlined in the flowchart depicted in FIG. 7.

Figure 7:
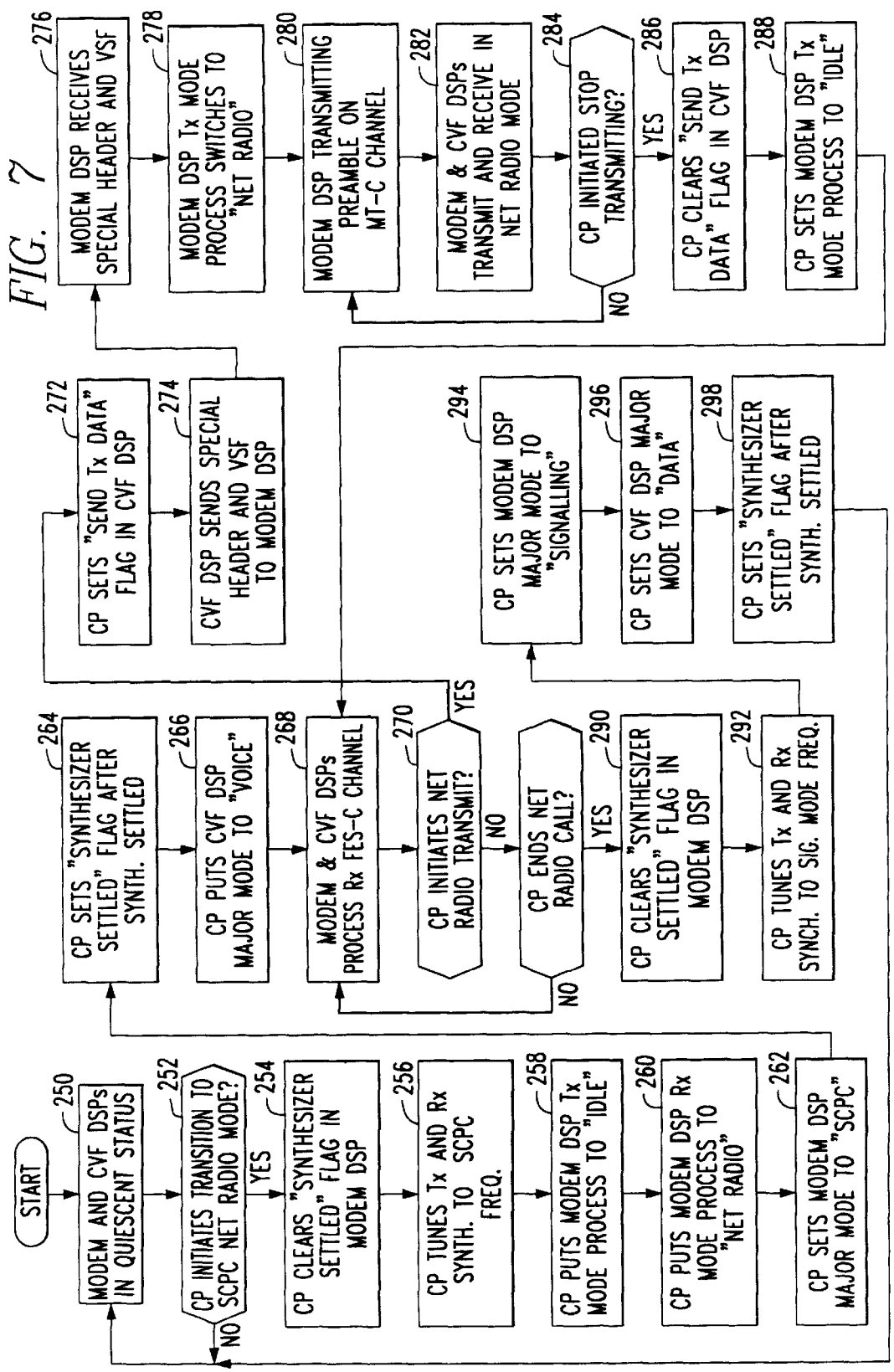
FIG. 7 is a flow chart illustrating the processing operation carried out by the digital signal processors shown in FIG. 1 during a Net Radio operational mode in accordance with the invention.

Referring now to FIG. 7, the DSPs 38 and 39 are initially in their quiescent state or signaling mode as shown by reference numeral 250 where outbound time-domain multiple access (OB TDMA) signals are received, demodulated, deframed, and processed. Also, request/response signals are processed, framed, modulated, and transmitted. This process continues until the CP 40 directs the DSPs 38 and 39 at 252 to transition to the Single Channel Per Carrier (SCPC) Net Radio mode. The CP 40 initiates the mode transition by clearing a "synthesizer settled" flag in the modem DSP 38 per step 254 and then issues SCPC frequency re-tune commands to the synthesizer 24 at 256. While the synthesizer 24 is re-tuning, the CP 40 sets the modem DSP 38 transmit mode processing to "idle" and the Modem DSP 38 receive mode processing to "Net Radio" as shown by steps 258 and 260. The CP 40 then sets the MAJOR MODE of the modem DSP 38 to the SCPC mode at step 262. Once the synthesizer 24 has re-tuned and settled, the CP 40 sets the "synthesizer settled" flag as shown at step 264. This action forces the transmit and receive processes into their respective single channel per carrier (SCPC) idle and Net Radio processing modes.

The CP 40 then sets the codec/viterbi/fax (CVF) DSP 39 to the "voice" mode per step 266. Although not shown, in order to hold the transmit chain in idle, the output of encoded voice subframes from DSP 39 is suspended by clearing a transmission "send Tx data" flag in the memory of DSP 39.

In the single channel per carrier or SCPC mode, the modem and CVF DSPs 38 and 39 process the signals received on the FES-C channel (step 268). The demodulation process in the modem DSP 38 samples the baseband signal of the down-converted FES-C communications channel, performs FFTs, acquires the correct frequency, and then converts the samples to symbols at a data rate of 6750 bps or 3375 symbols per second (1 symbol=2 bits). The symbols are passed to the receive deframing process which detects specific artifacts in the symbol stream, one of which is a unique word or UW, in order to correctly identify frames of data. The frame structure for Net Radio mode consists of a UW followed by 6 128-bit voice subframes (VSF).

With the receive deframing process in Net Radio mode, the six 128-bit subframes within each frame are buffered one at a time, descrambled and sent over a serial data port to the CVF DSP 39. In DSP 39, the voice decoder processes the 128-bit compressed VSF and outputs 20 ms worth of 8 KHz speech samples. The speech samples are passed to a digital to analog converter at the 8 KHz rate to interface the digital speech with an analog handset speaker. The receive deframing process remains in this mode for the duration of the Net Radio call.

With the transmit framing process in idle mode, the transmitter is disabled, the modem DSP does not perform any transmit processing and subsequently, the MT does not transmit a signal. An analog to digital converter samples the voice from the handset microphone and the CVF DSP buffers 20 ms worth of 8 KHz speech samples. Once the speech samples are collected, the voice encoder generates a 128-bit VSF (8 words). This VSF, along with a header and two status words (one indicates the presence or absence of voice in the VSF and the other indicates the VSF number 1 through 6), are generally sent to the modem DSP. While in the idle mode, however, the CVF DSP suspends output to the modem DSP. Although the output of the encoder is not used during idle mode, the encoder must be called every 20 ms to maintain the timing of the voice codec (coder/decoder).

The transmit process continues in this state until the CP 40 issues a command at step 270 for it to begin transmitting. This is done by the CP 40 setting the "send tx data flag" at step 272 in the CVF DSP 39. The transition of this flag from 0 to 1 causes two changes in the CVF DSP 39. First, it causes the CVF DSP 39 to send a special header as indicated by reference numeral 274 to the modem DSP at the next VSF boundary. Second, it causes subsequent encoded VSFs to be sent to the modem DSP 38 rather than dropping them on the floor. When the modem DSP 38 receives the special header value at step 276, it sets the modem DSP transmit framing process into Net Radio mode per step 278. The modem DSP 38 transmit framing process enables the transmitter and begins transmitting a 256 bit preamble sequence at step 280. The VSFs that are received from the CVF DSP 39 are buffered and then one at a time are scrambled and placed in the transmit buffer along with UWs to construct the Net Radio frame. The modulation process uses the buffered data to modulate the MT transmit carrier frequency and transmits a signal on a MT-C channel per step 282.

The transmit framing process continues in this transmit state until the CP issues a command for it to stop transmitting at 284. The CP does this by clearing the "send tx data flag" in the CVF DSP 39 in step 286 and setting the modem DSP transmit framing mode to idle in step 288. These two steps cause the transmitter to stop transmitting and essentially return to its previously idle state (268).

As the flow chart of FIG. 7 indicates, the CP 40 controls the transmit state of the MT. The receive state of the MT, in a Net Radio call never changes from that of receiving and processing the FES-C channel. To end a Net Radio call, the CP 40 zeros or clears the "synthesizer settled" flag in the modem DSP 38 at step 290, issues a re-tuning command to the synthesizer per step 292, sets the modem DSP major mode to "signaling" at 294, sets the CVF DSP major mode to "data" as shown by reference numeral 296 and once the synthesizer has settled, sets the "synthesizer settled" flag at step 298. The modem and CVF DSPs 38 and 39 return to their quiescent state (250).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A mobile terminal apparatus having a transceiver with a user interface, and an antenna for both radiating and collecting RF signals to and from a satellite, the transceiver comprising:

an RF section coupled to the antenna and a processor board coupled to the RF section and the user interface;

said processor board including, digital signal processor means for implementing a demodulator function, a modulator function, a receive framing function coupled to the demodulator, a transmit framing function coupled to the modulator, and a coding function and decoding function coupled to the transmit and receive framing functions, respectively;

digital control processor means coupled to the signal processor means for controlling the functions implemented thereby;

wherein said digital signal processor means includes means for operating in a voice mode, facsimile and data modes, signaling and packet switch modes, and a net radio mode including a normal mode, a private mode and a priority 1 mode; and wherein the priority 1 mode includes a sequential search of a net radio database for an available net channel of a plurality of net channels designated for net radio services, thereby increasing the probability of a successful priority 1 call request.

2. The apparatus of claim 2 wherein said search for an available channel is made following an unsuccessful attempt to use a designated default net channel.

3. The apparatus of claim 1 wherein an unsuccessful attempt to use said default net channel is followed by an attempt to use a net channel currently being used by the net.

4. The apparatus of claim 1 wherein said search for an available net channel is preceded by a function of determining which mobile terminal apparatus included in a plurality of mobile terminal apparatus defining a net has control of a channel assigned to the net, and depending on which mobile terminal apparatus of said net has said control, a first channel option of using a designated default channel is utilized and if unavailable this is followed by a second channel use option of the channel currently in use or a channel selected by a user, and in the event both said options cannot be used, said net search function is utilized.

5. The apparatus of claim 1 wherein said digital signal processor means comprises a first signal processor unit that includes the demodulator function, the receive framing function, the modulator function, and the transmit framing function; and a second signal processor unit including the decoding and encoding function.

6. The apparatus of claim 5 wherein said first signal processor unit comprises a modem type signal processor.

7. The apparatus of claim 5 wherein said second signal processor comprises a codec, viterbi and fax type signal processor.

8. The apparatus of claim 1 wherein said user interface includes a set of user actuated keys, said keys further including two designated keys for separately initiating a push-to-talk function.

9. The apparatus of claim 8 wherein said two keys are located on a handset.

10. The apparatus of claim 9 wherein said two keys are configured for use wherein one key of said two keys is for use by right handed users and the other key of said two keys is for use by left handed users.

11. The apparatus of claim 10 wherein said two keys comprise numerical keys "1" and "3" of a set of numerical handset keys thus allowing an off-the-shelf cellular handset to be utilized to provide push-to-talk functionality.

12. A method of making a priority 1 net radio service mode call in a mobile terminal of a mobile satellite service system and overriding any previously established net radio talker in order to obtain control of a specific communication channel or to initially set up a call where a desired net channel is available or not currently active, comprising the steps of:

formatting and transmitting a signalling unit message request in signal processing means of the mobile terminal for a priority 1 net radio call;

determining a net channel for placing said priority 1 call in accordance with a predetermined net channel assignment procedure including a step of searching for an available net channel in a net channel data base including a plurality of radio service net channels for increasing the probability of a successful priority 1 call;

receiving a priority 1 net channel assignment;

tuning to the assigned net channel; and activating means for transmitting a voice communication signal to the system.

13. The method of claim 12 wherein said net channel assignment procedure includes a prior step of attempting to use a predesignated default channel which, if unsuccessful, results in resorting to said searching step.

14. The method of claim 12 wherein said net channel assignment procedure includes a first prior step of attempting to use a currently selected net channel and wherein, if unsuccessful, is followed by a second prior step of attempting to use a designated default net channel and wherein, if both said prior steps are unsuccessful, results in resorting to said searching step.

* * * * *